United States Patent [19]

Takahashi et al.

[11] Patent Number: 4,527,858
[45] Date of Patent: Jul. 9, 1985

[54] UNIFORM SPEED SCANNING LENS HAVING A HIGH RESOLVING POWER

[75] Inventors: Sadatoshi Takahashi; Masamichi Tateoka, both of Tokyo, Japan

[73] Assignee: Canon Kabushiki Kaisha, Tokyo, Japan

[21] Appl. No.: 675,263

[22] Filed: Nov. 27, 1984

Related U.S. Application Data

[63] Continuation of Ser. No. 331,827, Dec. 17, 1981, abandoned.

[30] Foreign Application Priority Data

Dec. 24, 1980 [JP] Japan .................... 55-184867

[51] Int. Cl.³ .................... G02B 9/58; G02B 9/60; G02B 27/17
[52] U.S. Cl. .................... 350/6.8; 350/420; 350/464; 350/465
[58] Field of Search ............. 350/6.8, 420, 463, 464, 350/469, 465

[56] References Cited

U.S. PATENT DOCUMENTS 4,130,339 12/1978 Kawamura et al. .............. 350/6.8
4,130,350 12/1978 Koizumi ........................ 350/465
4,277,128 7/1981 Kawamura ..................... 350/420

FOREIGN PATENT DOCUMENTS 647631 2/1979 U.S.S.R. ........................ 350/464

OTHER PUBLICATIONS

Minami et al., "Optical Lens System for Laser Beam Printer", Proc. Soc. Photo-Opt. Instrum. Eng., vol. 193, 1979, pp. 202-208.

Primary Examiner—John K. Corbin
Assistant Examiner—Rebecca D. Gass
Attorney, Agent, or Firm—Fitzpatrick, Cella, Harper & Scinto

[57] ABSTRACT

A uniform speed scanning lens having a high resolving power comprises, in succession from the object side to the image side, a first component comprising a negative meniscus lens having its concave surface facing the object side, a second component comprising two or more positive lenses, and a third component comprising a negative lens having its concave surface facing the object side.

7 Claims, 7 Drawing Figures

UNIFORM SPEED SCANNING LENS HAVING A HIGH RESOLVING POWER

This application is a continuation of application Ser. No. 331,827 filed Dec. 17, 1981, now abandoned.

BACKGROUND OF THE INVENTION

1. Field of the Invention

This invention relates to a high resolution uniform speed scanning lens for use in an information processing terminal apparatus for recording or reading images.

2. Description of the Prior Art

In FIG. 1 of the accompanying drawings, a perspective view of a laser recording apparatus, which is an embodiment of an information processing terminal apparatus, is shown as an example of apparatus using a uniform speed scanning lens. In FIG. 1, a laser beam oscillated by a laser oscillator 1 enters a light modulator 2. The beam, subjected to modulation by the light modulator in accordance with an information signal to be recorded has its beam diameter expanded by a beam expander 3, but remains a parallel beam, and is incident on a light deflector 4. The beam is deflected at an constant angular speed by the light deflector, which may be, for example, a rotatable polygonal mirror or a galvano mirror. The deflected beam is imaged on a recording medium 6 (for example, a sensitive film) by an imaging lens 5.

In the imaging lens, like an ordinary photographic lens, the image height y is proportional to the tangent of the incident angle $\theta$. That is, if a $y = f \tan \theta$ lens is used (f is the focal length of the imaging lens), $dy/d\theta = \sec^2\theta$ and for a constant angular speed deflection, the beam spot on the imaging plane must move at a uniform speed. Therefore, if a lens in which the incident angle is proportional to the image height, namely, a lens having a characteristic of $y = f \cdot \theta$ (that is an f-$\theta$ lens) is used as the imaging lens, $dy/d\theta = f$ and, if the beam is deflected at a constant angular speed by the rotatable polygonal mirror, the spot will move at a uniform speed on the recording medium. That is, in order that the scanning beam may be imaged flatly and at a uniform speed on a scanning surface by the use of a deflector effecting an equal angular speed deflection, the imaging lens used must be a lens having a characteristic of $Y = f \cdot \theta$.

An example of a f-$\theta$ lens used in the conventional information processing terminal apparatus is disclosed in U.S. Pat. No. 4,056,307 and the cross-section of this lens is shown in FIG. 2 of the accompanying drawing. In FIG. 2, reference numeral 1 designates a pupil which is comprised of a deflector such as a rotatable polygonal mirror. Reference numerals 2 to 7 denote cylindrical lenses each having a power in a plane parallel to the scanning direction (the direction horizontal relative to the plane of the drawing sheet), reference numeral 8 designates a cylindrical lens having a power in a plane perpendicular to the scanning direction (the direction perpendicular and vertical relative to the plane of the drawing sheet), and reference numeral 9 denotes an imaging plane (a scanned surface). Another example of an f-$\theta$ lens used in another information processing terminal apparatus, is described in 'Three Optimized Designs For Flat Field Scanning Lenses' announced by R. E. Hopkins in p.110–p.114 of SPIE vol. 84 Laser Scanning Components & Techniques (1976), and the cross-section of this lens is shown in FIG. 3 of the accompanying drawing. In FIG. 3, reference numeral 10 designates a pupil, reference numerals 11 to 14 denote spherical lenses, and reference numeral 15 designates an imaging plane. A characteristic of these conventional f-$\theta$ lenses is that the F-number is as dark as F no=8. Where the f-$\theta$ lens is used in such a scanning system, a sufficiently large space must be provided between the deflector and the scanning lens because of the fact that the deflector is rotated. This is particularly so where the focal length of the scanning lens is short. However, in the conventional f-$\theta$ lens, for example, the lens disclosed in the aforementioned U.S. patent, $t/f = 0.4239$, where t is the distance from the pupil (in this case, the deflecting surface of the deflector) to the first surface of the scanning lens and f is the focal length of the lens, and thus the spacing between the deflector and the scanning lens could not be said to be sufficient.

SUMMARY OF THE INVENTION

It is an object of the present invention to provide a uniform speed scanning lens in which the F-number is bright and the spacing between the deflector and the scanning lens is sufficient for proper operation.

It is a further object of the present invention to provide a scanning lens which is capable of scanning the entire scanned surface area with a substantially uniform beam spot.

The scanning lens according to the present invention comprises three components, namely, in succession from the light beam incidence side (hereinafter referred to as the object side), a first component comprising a negative meniscus lens having its center of curvature on the object side, a second component comprising two or more positive lenses, and a third component comprising a negative lens having its concave surface facing the object side.

Further, in the scanning lens according to the present invention, the ratio of the distance between the entrance pupil and the first surface of the lens system to the focal length is approximately 1. That is, the scanning lens of the present invention is a substantially telecentric optical system and can provide for a uniform spot over the entire scanned surface.

The invention will become more fully apparent from the following detailed description thereof taken in conjunction with the accompanying drawing.

DESCRIPTION OF THE PREFERRED EMBODIMENTS

Figure 1:
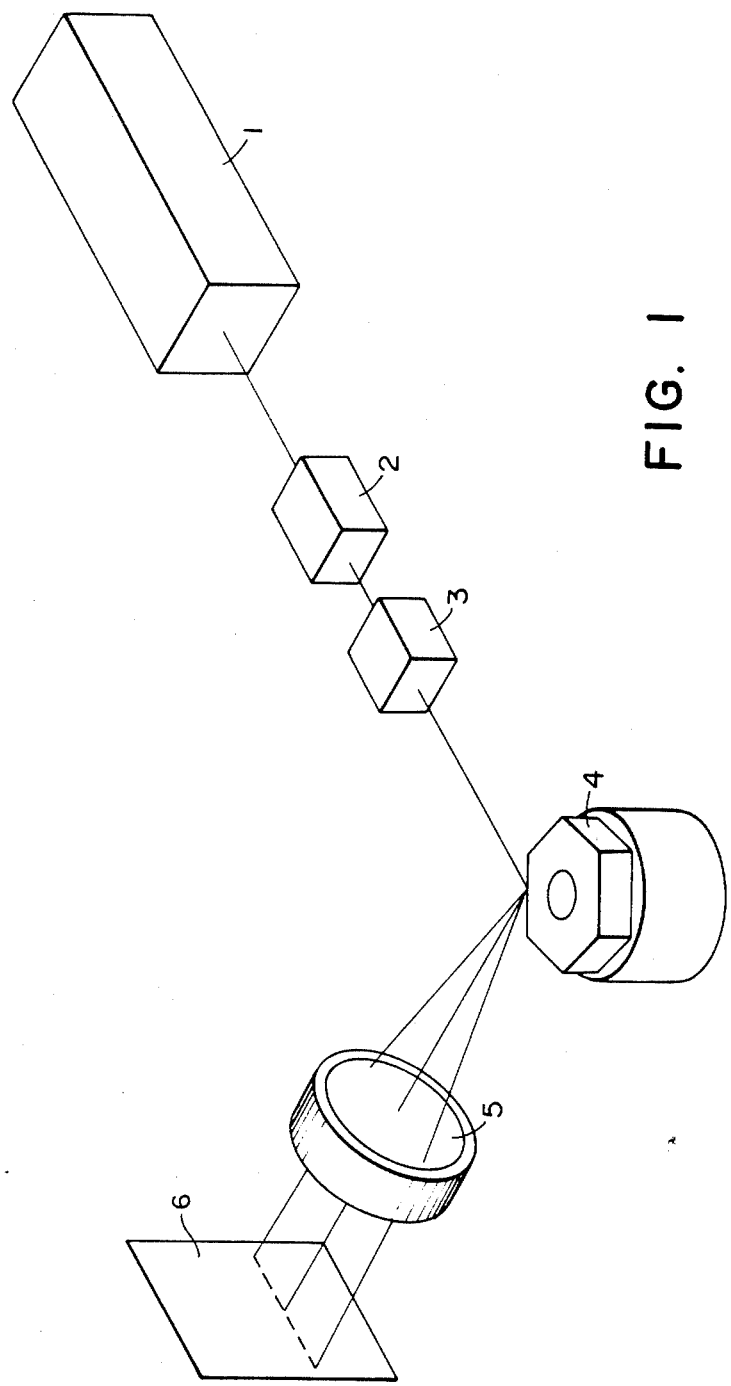
FIG. 1 schematically shows a laser apparatus as an embodiment using a scanning lens.
Figure 2:
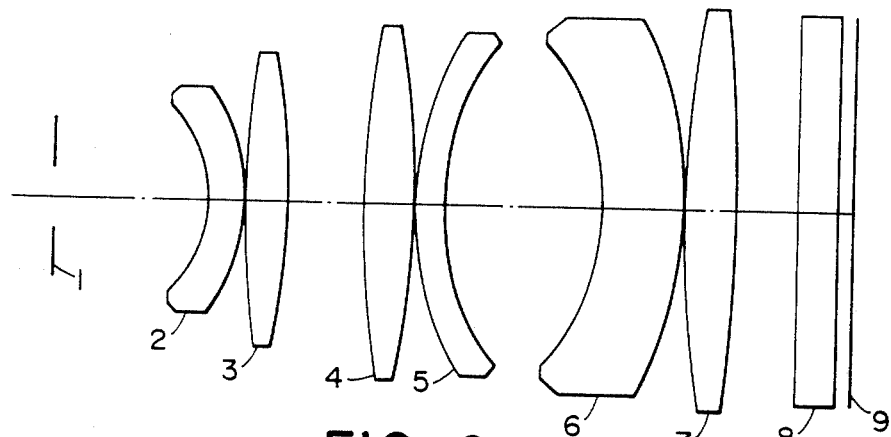
FIGS. 2 and 3 show the cross-sections of uniform speed scanning lenses according to the prior art.
Figure 3:
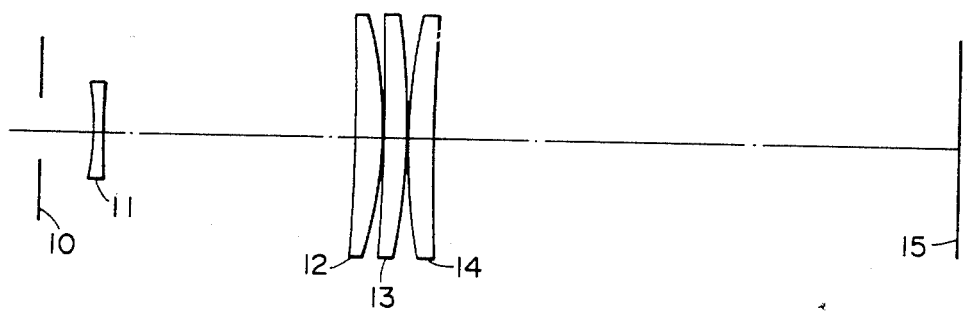

The scanning lens of the summarized above construction will now be described in detail. The first lens component comprises a negative meniscus lens having its concave surface facing the object side in order to minimize the astigmatism created in this negative meniscus lens and in order to create negative spherical aberration and coma in this meniscus lens to correct the positive spherical aberration and coma created in a second lens component that comprises of a positive lens which will hereinafter be described.

Next, the second lens component comprises two or more positive lenses in order to create positive distortion in this lens group to obtain the uniformity of speed which is the object of the present invention. That is, ordinary lenses (for example, photographic lenses or the like) are $f \tan \theta$ lenses, whereas it is an object of the present invention to provide a lens that causes a beam spot to scan the image plane at a uniform speed when a rotatable polygonal mirror or the like is rotated at a predetermined angular speed as previously mentioned. That is, the lens used in the present invention is an $f$-$\theta$ lens.

For this purpose, the third order distortion-aberration coefficient V must be $V = \frac{2}{3}$. Considering this point qualitatively, an $f$-$\theta$ lens is required to bend the off-axis principal ray near the optical axis more than is an ordinary $f \tan$ lens. That is, in the lens system of the present invention, the principal ray is most spaced apart from the optical axis in the second group and therefore, a convex group is disposed there so that the principal ray is bent sharply in the direction of the optical axis in this positive lens group. If the second group is comprised of a positive lens, the aberrations other than distortion will become great and therefore, in order to reduce the amount of other aberrations created and render distortion to a desired value, two or more positive lenses must be used.

Next, by using a negative lens as the third component, the forward principal point of the entire lens system can be disposed on the object side of the lens system. That is, the ratio of the distance from the forward focus of the lens system to the first surface, which is a surface most adjacent to the object side to the focal length f, can be made great. By placing the pupil at the forward focus, the lens system becomes a telecentric system, the principal ray of the emergent light can be made parallel to the optical axis, and a uniform spot can be obtained over the entire picture plane. Further, this negative lens has its concave surface facing the object side. With this concave surface, negative distortion is created to correct the positive distortion excessively created in the second group and further, negative astigmatism is created to correct the positive astigmatism created in the second group. Also, by making the third group negative, the Petzval sum created in the second group is corrected.

By constructing the lens system as described above, a scanning lens is provided in which the distortion coefficient V in the three groups as a whole satisfies $V = \frac{2}{3}$; spherical aberration, coma and curvature of image field are well corrected; and resolution is high; and the speed of scanning by a beam spot is uniform in the image plane.

The lens data for the scanning lens according to the present invention (a first embodiment to a fourth embodiment) will now be shown below. In the tables below, $r_i$ represents the radius or curvature of the ith surface as counted from the object side, $d_i$ represents the on-axis thickness or the on-axis space between the ith surface and the $i+1$th surface, $n_i$ represents the refractive index of the ith lens, a represents the deflecting plane (here, the pupil plane), $d_0$ represents the on-axis are space between the pupil plane and the first surface, S represents the imaging plane, f represents the focal length, and Fno represents the F-number.

Figure 4:
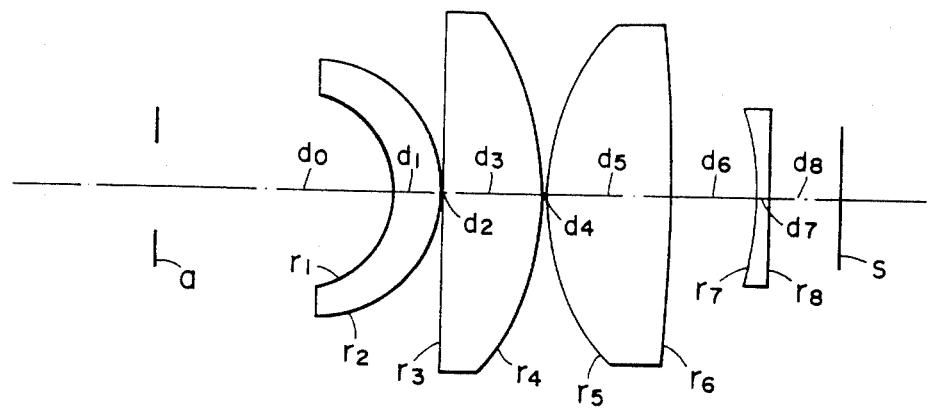
FIGS. 4, 5, 6 and 7 show the cross-sections of uniform speed scanning lenses according to the present invention.
Figure 5:
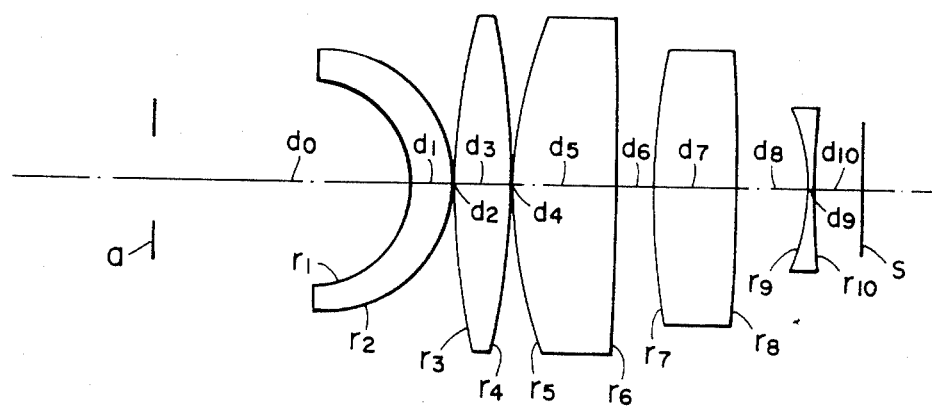
Figure 6:
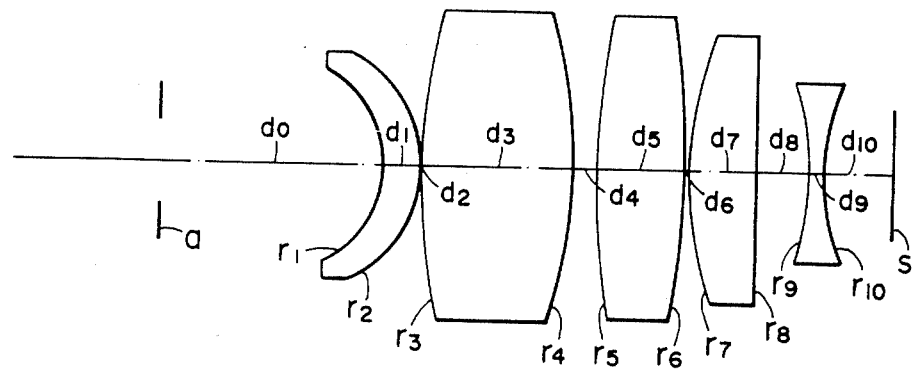
Figure 7:
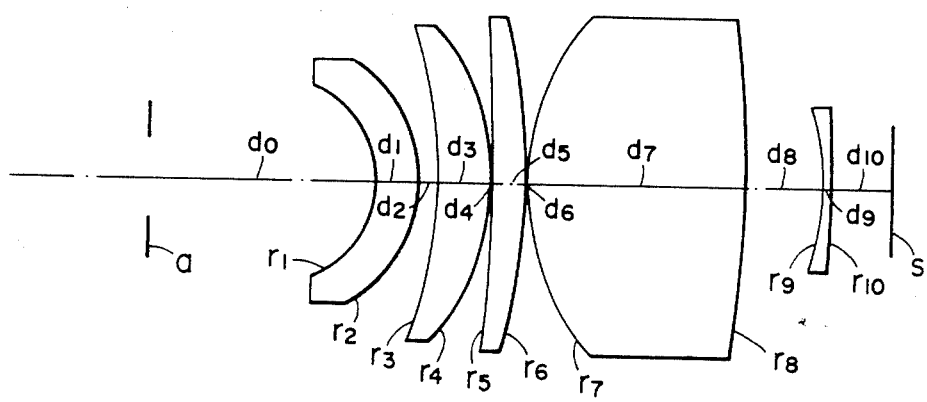

The lens cross-section of the first embodiment is shown in FIG. 4. The lens cross-section of the second embodiment is shown in FIG. 5. The lens cross-section of the third embodiment is shown in FIG. 6, and the lens cross-section of the fourth embodiment is shown in FIG. 7. The various aberration values in each embodiment are shown in Table 1, wherein I represents spherical aberration, II represents coma, III represents astigmatism, P represents Petzval sum and V represents distortion.

| First Embodiment (FIG. 4 Arrangement) |||
|---|---|---|
| $f = 1$, F no = 1:3 Wavelength used $\lambda = 0.6328\mu$ |||
| | $d_0 = 0.9996$ | |
| $r_1 = -0.3712$ | $d_1 = 0.1795$ | $n_1 = 1.6983$ |
| $r_2 = -0.4997$ | $d_2 = 0.0344$ | |
| $r_3 = 27.0356$ | $d_3 = 0.4268$ | $n_2 = 1.6881$ |
| $r_4 = -1.2229$ | $d_4 = 0.0278$ | |
| $r_5 = 0.9968$ | $d_5 = 0.5241$ | $n_3 = 1.5706$ |
| $r_6 = -6.7020$ | $d_6 = 0.3715$ | |
| $r_7 = -0.9242$ | $d_7 = 0.0395$ | $n_4 = 1.7979$ |
| $r_8 = 18.1544$ | $d_8 = 0.3158$ | |

| Second Embodiment (FIG. 5 Arrangement) |||
|---|---|---|
| $f = 1$, F no = 1:3 Wavelength used $\lambda = 0.6328\mu$ |||
| | $d_0 = 1.1028$ | |
| $r_1 = -0.4212$ | $d_1 = 0.1745$ | $n_1 = 1.8000$ |
| $r_2 = -0.5391$ | $d_2 = 0.0049$ | |
| $r_3 = 2.6147$ | $d_3 = 0.2404$ | $n_2 = 1.6726$ |
| $r_4 = -3.0344$ | $d_4 = 0.0140$ | |
| $r_5 = 1.8431$ | $d_5 = 0.4447$ | $n_3 = 1.7292$ |
| $r_6 = -18.8206$ | $d_6 = 0.1486$ | |
| $r_7 = 3.0407$ | $d_7 = 0.3513$ | $n_4 = 1.8000$ |
| $r_8 = -9.1538$ | $d_8 = 0.3070$ | |
| $r_9 = -0.7904$ | $d_9 = 0.01939$ | $n_5 = 1.5306$ |
| $r_{10} = 3.8326$ | $d_{10} = 0.2022$ | |

| Third Embodiment (FIG. 6 Arrangement) |||
|---|---|---|
| $f = 1$, F no = 1:3 Wavelength used $\lambda = 0.6328\mu$ |||
| | $d_0 = 0.9476$ | |
| $r_1 = -0.4139$ | $d_1 = 0.1137$ | $n_1 = 1.5402$ |
| $r_2 = -0.5102$ | $d_2 = 0.0161$ | |
| $r_3 = 2.6277$ | $d_3 = 0.6314$ | $n_2 = 1.7082$ |
| $r_4 = -2.0674$ | $d_4 = 0.1010$ | |
| $r_5 = 3.5273$ | $d_5 = 0.3474$ | $n_3 = 1.8000$ |
| $r_6 = -4.2011$ | $d_6 = 0.0238$ | |
| $r_7 = 1.5305$ | $d_7 = 0.2827$ | $n_4 = 1.8000$ |
| $r_8 = -31.4553$ | $d_8 = 0.2128$ | |
| $r_9 = 1.1007$ | $d_9 = 0.0545$ | $n_5 = 1.5197$ |
| $r_{10} = 0.8103$ | $d_{10} = 0.2910$ | |

| Fourth Embodiment (FIG. 7 Arrangement) |||
|---|---|---|
| $f = 1$, F no = 1:3 Wavelength used $\lambda = 0.6328\mu$ |||
| | $d_0 = 0.9439$ | |
| $r_1 = -0.4188$ | $d_1 = 0.1666$ | $n_1 = 1.8001$ |
| $r_2 = -0.5792$ | $d_2 = 0.0927$ | |
| $r_3 = -1.7720$ | $d_3 = 0.2236$ | $n_2 = 1.6500$ |
| $r_4 = -0.9345$ | $d_4 = 0.0132$ | |
| $r_5 = -6.2893$ | $d_5 = 0.1324$ | $n_3 = 1.7608$ |
| $r_6 = -2.6786$ | $d_6 = 0.0084$ | |
| $r_7 = 1.0716$ | $d_7 = 0.8974$ | $n_4 = 1.6090$ |
| $r_8 = -4.5984$ | $d_8 = 0.3281$ | |
| $r_9 = -0.9357$ | $d_9 = 0.0246$ | $n_5 = 1.8000$ |
| $r_{10} = -13.8821$ | $d_{10} = 0.2545$ | |

TABLE 1

| Embodiment | Aberration coefficient ||||| 
|---|---|---|---|---|---|
| | I | II | III | P | V |
| 1 | 0.2333 | 0.1279 | 0.0491 | −0.0223 | 0.8365 |
| 2 | 0.1030 | 0.0236 | 0.0301 | −0.0277 | 0.8455 |
| 3 | 0.1369 | 0.0722 | 0.0180 | 0.0020 | 0.7924 |
| 4 | 0.1501 | 0.1229 | 0.0182 | −0.0096 | 0.7299 |

What we claim is:

1. A uniform speed scanning lens having high resolving power, comprising, in succession from the object side on which light is incident on said lens to the image side from which light emerges from said lens:

a first component comprising a negative meniscus lens having its concave surface facing the object side;

a second component comprising at least two positive lenses; and a third component comprising a negative lens having its concave surface facing the object side, the distance on the optical axis between said second component and said third component being greater than the distance on the optical axis between said first component and said second component.

2. A scanning lens according to claim 1, wherein the ratio of the on-axis air space between the entrance pupil of said lens and said first component to the focal length of said lens is approximately 1.

3. A scanning lens according to claim 1, wherein said second component comprises two biconvex lenses.

4. A scanning lens according to claim 1, wherein said second component comprises three positive lenses.

5. A scanning lens according to claim 4, wherein said second component comprises three biconvex lenses.

6. A scanning lens according to claim 4, wherein said second component comprises, in succession from the object side to the image side, a first meniscus lens having its concave surface facing the object side, a second meniscus lens having its concave surface facing the object side, and a biconvex lens.

7. A scanning apparatus for scanning a scanning surface and including a uniform speed scanning lens having high resolving power, said apparatus comprising:

a light source portion for supplying a light beam for scanning;

a rotatable polygonal mirror having a deflecting-reflecting surface for deflecting the light beam from said light source portion; and a scanning lens for imaging the light beam deflected by said rotatable polygonal mirror on the scanning surface, said lens comprising, in succession from the object side thereof on which the light beam is incident from said polygonal mirror to the image side thereof facing the scanning surface, a first component comprising a negative meniscus lens having its concave surface facing the object side, a second component comprising at least two positive lenses, and a third component comprising a negative lens having its concave surface facing the object side, the distance on the optical axis between the deflecting-reflecting surface of said polygonal mirror and the object side surface of said first component being substantially equal to the focal length of said scanning lens, and the distance on the optical axis between said second component and said third component being greater than the distance on the optical axis between said first component and said second component.

* * * * *